United States Patent
Mampe et al.

(10) Patent No.: US 7,145,093 B2
(45) Date of Patent: Dec. 5, 2006

(54) METHOD AND SYSTEM FOR IMAGE PROCESSING

(75) Inventors: John J. Mampe, Fort Worth, TX (US); Shahrom Kiani, Arlington, TX (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 83 days.

(21) Appl. No.: 10/610,979

(22) Filed: Jul. 1, 2003

(65) Prior Publication Data

US 2004/0120547 A1 Jun. 24, 2004

(51) Int. Cl.
*G06K 9/00* (2006.01)

(52) U.S. Cl. ............... 209/584; 209/939; 382/101

(58) Field of Classification Search ........ 209/583, 209/584, 900, 939; 382/101, 102, 218, 318
See application file for complete search history.

(56) References Cited

U.S. PATENT DOCUMENTS

| | | | | |
|---|---|---|---|---|
| 4,972,273 A * | 11/1990 | Burkhardt et al. | ......... | 358/443 |
| 4,992,649 A * | 2/1991 | Mampe et al. | ......... | 209/546 |
| 5,134,669 A * | 7/1992 | Keogh et al. | ......... | 382/318 |
| 5,293,432 A * | 3/1994 | Gonser et al. | ......... | 382/299 |
| 5,311,999 A | 5/1994 | Malow et al. | | |
| 5,422,821 A | 6/1995 | Allen et al. | | |
| 5,504,319 A * | 4/1996 | Li et al. | ......... | 235/462.08 |
| 5,600,732 A * | 2/1997 | Ott et al. | ......... | 382/112 |
| 5,889,897 A | 3/1999 | Medina | | |
| 5,974,147 A | 10/1999 | Cordery et al. | | |
| 2001/0019619 A1 * | 9/2001 | Watanabe et al. | ......... | 382/112 |
| 2002/0168090 A1 * | 11/2002 | Bruce et al. | ......... | 382/101 |
| 2003/0012407 A1 * | 1/2003 | Rosenbaum et al. | ......... | 382/101 |
| 2004/0165748 A1 * | 8/2004 | Bonner et al. | ......... | 382/101 |

* cited by examiner

*Primary Examiner*—Joseph Rodriguez

(57) ABSTRACT

The invention provides a method of processing an image containing written information include the steps of (a) scanning a surface of an object to obtain an image of the surface represented by first image data, (b) creating second image data from the first image data, the second image data having a lower data density than the first image data, (c) analyzing the second image data with first image analysis logic to decode the written information, and (d) if the written information cannot be decoded to a desired extent from the second image data, analyzing the first image data with second image analysis logic different from the first image analysis logic to decode the written information. Steps (a) and (b) preferably use a single scanning device to create the high data density image (e.g., color or grayscale) from which the lower data density image (e.g., binary or black and white) can then be created. The resulting two-stage image analysis provides a significant improvement in OCR results. Further, when a pre-printed bar code is present but does not result in a destination bar code, using the methods of step 7, determining the destination address zip code using OCR techniques, printing the resultant ZIP Code and sorting the mail based on the new OCR derived data.

20 Claims, 3 Drawing Sheets

METHOD AND SYSTEM FOR IMAGE PROCESSING

TECHNICAL FIELD

The present invention relates to the automated processing of images, in particular to the scanning and processing of images of mail pieces to decode address and other information.

BACKGROUND OF THE INVENTION

Current state-of-the art postal address processing normally acquires address information appearing on mail pieces in electronically captured binary form. This information is then used by automated mail sorting equipment and processing systems to sort the mail based upon the captured destination information. In these systems, scanners of various types are used to capture an image of one or more surfaces of a mail piece. The image is then analyzed using automated or human-aided systems such as optical character recognition (OCR), a bar code reader (BCR), specialized video processing systems, image processing systems, forms readers, forms video processing, and video coding systems. Allen et al. U.S. Pat. No. 5,422,821 describes one such system wherein mail piece addresses and bar codes are scanned and checked against a forwarding address database so that forwarding to the new address can occur without first sending the mail piece to the old address. Other systems only use bar code readers, acquiring destination information from bar codes previously applied to the mail pieces.

U.S. Pat. No. 5,311,999 describes a tunnel scanner for packages wherein image data for different sides of the parcel is taken in a rough scan, and then a fine scan is made of one of the sides based on operator recognition of a split screen display of all the scanned images, e.g., the one with the writing on it is chosen. The operator, using a touch screen, mouse or similar device, chooses the partial image. In an alternative automated embodiment, six images obtained from the rough scan are examined for regions, which coincide in a selection of features with the model of an address sticker, or an address region on a package. Features of this type are, for example, the color contrast of an area compared to its surroundings, the gray value contrast of an area compared to its surroundings, the shape of this area, the type and number of dark regions within the area, its location with respect to other distinct objects and with respect to the outline of the package.

According to known image recognition methods, the image most likely containing an address region is selected automatically from the images obtained by rough scanning, whereupon this region is subjected to fine scanning. The images may also already be supplied to an automatic character recognition device. Fine scan processing then takes place only if the images obtained by rough scanning are selected by the region of interest selection device. Rough scanning may be also be done by extracting a down sampled rough image from a fine (high resolution) scan.

Conventional scanning methods rely on a number of techniques for identifying and decoding possible regions of interest on a scanned mail piece. According to one such system, the overall image is subdivided into a 3-by-3 array of nine areas. Each area has a predetermined probability associated with it that any written matter found within the area will be an address. The center area may be assigned the highest probability. Current software also checks written matter in each region to determine whether it forms lines, is text justified, uses a single (common) font, and whether the matter is a bar code. All of these factors are considered in determining whether an address or other specific type of identification has been found. For purposes of performing several different kinds of analysis (e.g., OCR) simultaneously, it is preferred to send the initial scan results to more than one computer or processor.

Scanning systems of the kind used to read mail can also be used to read forms, such as postal change of address forms. According to current United States Postal Service (USPS) procedures, a person wishing to have the USPS forward mail to a new address submits a Change of Address (COA) Order Form (Form 3575) that requests mail forwarding. This form is normally completed by hand-printing the requested information including name, old address, new address, whether the move is for a family or individual, effective date and duration of the change on the form and submitting the form to a local post office. Commonly-assigned U.S. patent application Ser. No. 09/534,182, filed Mar. 24, 2000, the contents of which are hereby incorporated by reference herein for all purposes, provides a process for handling such forms wherein it is necessary to transmit the image from the computer associated with the scanner to a second computer which is used to analyze (decode) the image. The images are generally transmitted through a network or other data communication line.

For purposes of both mail pieces and form processing, the read rate of the scanning system should be as high as possible. Systems such as MLOCR (multiline optical character readers) and bar code scanners are incorporated into postal sorting machines now in use such as DIOSS (delivery bar code sorter/optical character reader/input subsystem/output subsystem) machines and DBCS (delivery bar code sorter) machines. These systems achieve read rates as high as 80%. However, the unreadable mail must be diverted and sent to video coding, where a human operator reviews an image of the mail piece and keys in the corrected address so that the corresponding zip+4 postal bar code can be printed on the mail piece. This manual review process is laborious and expensive, and it has been estimated that a 1% improvement in read rate corresponds to a savings of 9.5 million dollars per day. The present invention provides a system and method that can significantly improve the OCR and bar code scanning success rate in postal operations and potentially in other environments.

SUMMARY OF THE INVENTION

The invention provides a method of processing an image containing written information include the steps of:

(a) scanning a surface of an object to obtain an image of the surface represented by first image data;

(b) creating second image data of the image of the surface, the second image data having a lower data density than the first image data;

(c) analyzing the second image data with first image analysis logic to decode the written information; and (d) if the written information cannot be decoded to a desired extent from the second image data, analyzing the first image data with second image analysis logic different from the first image analysis logic to decode the written information. As used herein the term "written information" includes alphanumeric characters, bar codes and other machine readable indicia including handwritten information, printed information, and information encoded onto the surface of an article such as a mail piece using similar techniques. Steps (a) and (b) preferably use a single scanning device to create the high data density image (e.g., color or grayscale) from which the lower data density image (e.g., binary or black and white) can then be created. However, in a variant of this method, the two images could be created from separate scans. "Data density" in this case refers to the well-known differences in total bytes per unit size between like images saved in different graphics formats.

The method of the invention is typically practiced on mail pieces such as letters or flats that are passing through a postal sorting machine at a high feed rate. Thus, steps (a)–(d) are typically carried out for a succession of images, and a buffer is maintained containing the second image data for a number of consecutive images so that the second image data is maintained in the buffer during step (c). The computer memory buffer is then accessed when necessary to obtain the image for processing in step (d). The postal sorting machine may use a bar code scanner (BCS), an optical character recognition (OCR) scanner, or both, and the method of the invention can be adapted to the scan type and the make-up of the incoming mail in a number of ways.

In the case of mail pieces, the goal is to determine the destination address of the mail piece so that the mail piece can be sorted or otherwise processed accordingly. The preferred destination reflected in the postal bar code is a zip+4 postal bar code, although other levels of specificity could be chosen, e.g., just the basic 5 digit zip code. For a sorter equipped with bar code scanning capability only, the scanned image is analyzed to read the bar code, and if a valid destination address is identified, the mail piece passes through the system with no further processing and is sorted based on the result. If the mail piece has a postal bar code thereon which cannot be decoded, the first image data is then analyzed to make a second attempt at decoding. If the first image data is successfully decoded before the mail piece reaches an essential decision point downstream, usually the first diverter gate, then the mail piece is sorted based on the second decoding attempt. However, many bar code sorting machines provide a relatively short conveyor path distance between the scanner and the first diverter gate, allowing insufficient time for the second decoding attempt to run to completion. In such a case, the mail piece is sorted to a reject bin. Later, the correct zip code is determined either by re-feeding the mail piece to a machine capable of applying an ID tag and associating it with a video image, or through video coding by a human operator. An ID labeled mail piece can be fed into an input/output subsystem that reads the ID tag, finds the result and labels the mail piece with the correct bar code, so that it can be sorted in a normal manner when re-fed into a sorting machine. In the alternative, a sorter can be programmed to read the ID tag, obtain the result of offline processing such as video coding, and sort the mail piece by reference to the result without need for relabeling the mail piece with the correct bar code.

The method of the invention proceeds along similar lines when the machine uses optical character recognition to read mail pieces lacking bar codes, except that the first and second image data represent alphanumeric characters. In this instance, the items being processed may be something other than mail pieces, for example, forms that are being scanned such as change of address forms as mentioned in Allen et al. U.S. Pat. No. 5,422,821 and Bruce et al. U.S. Patent Publication 2002/0168090, Nov. 14, 2002. OCR-based sorters are often provided with bar code printers and have a greater transport path length that BCR machines. As a result, upon successful resolution of the address by means of optical character recognition, a postal bar code can be applied to the mail piece before it is sorted. This bar code will often be used in later, downstream sorting processes.

The method of the invention can also be applied to mail processing machines such as DIOSS having both bar code and OCR capabilities. The mail incoming to such a machine may be entirely pre-bar coded, or may be a mix of bar coded and un-bar coded mail pieces. According to a preferred method of the invention, where the mail pieces include both mail pieces with both alphanumeric address and postal bar code information thereon, and mail pieces with alphanumeric address information lacking a postal bar code, steps (c) and (d) preferably further comprise:

determining if a mail piece has a postal bar code thereon;

if the mail piece has a postal bar code thereon, analyzing the second image data to decode the postal bar code;

if the decoded bar code identifies a destination address, ending the method as to such mail piece;

if the decoded postal bar code does not identify a destination address, analyzing the first image data to decode the postal bar code;

if the mail piece lacks a postal bar code that identifies a destination address, or has a postal bar code thereon which cannot be decoded from either the first or second image data, then analyzing the second image data to read a postal address from alphanumeric address data using optical character recognition;

if the decoded alphanumeric address data identifies a destination address, ending the method as to such mail piece;

if the decoded alphanumeric address data does not identify a destination address, analyzing the first image data to decode the destination address; and if the mail piece has alphanumeric address data that cannot be decoded from either the first or second image data, then optionally diverting the mail piece for human review.

According to this aspect of the invention, four computer-implemented attempts may be made at decoding either the bar code and the written address on the mail piece. As in the OCR embodiment discussed above, it may be possible to complete secondary processing using the first image data on the bar code or address or both before the associated mail piece reaches the first downstream decision point in a sorting process. In such a case, the mail piece may be sorted based on the decoded bar code, the decoded address, or an arbitrated result. Such an arbitrated result is determined by software comparing the results obtained from the decoded bar code and the decoded address and deciding which to base the sorting decision on, or whether a result derived in part from each represents the correct destination. If the bar code is only readable to five digits, for example, the hand written address may provide enough information to derive the remaining digits from a computerized table of 9-digit zip codes. In another case, the bar code may be readable but in conflict with the written address, in which case a decision is made, based on past experience, whether to sort on the basis of the zip code or the written address.

At each stage where decoding is attempted, the computer-implemented method must be programmed to decide whether it will end the method based on an apparent successful result, or continue processing. Normally a bar code than scans on the first try (based on the second data, typically binary) is highly reliable, and therefore upon a successful first attempt at decoding the bar code, all other decoding for that mail piece is terminated. On the other hand, as to a bar code that failed to decode on the first try but was decoded on a second attempt using the first data (e.g., grayscale), it may be preferred to await the outcome of OCR processing and compare the results before reaching a decision.

The decoding of bar code and address results above may be carried out either in series or in parallel, in any desired order. The specific procedure will depend in part on the length of the sorter path (if the method is being used on a sorter) and the computing resources available, which will determine how rapidly a result can obtained. For example, bar code processing and OCR processing may be initiated at the same time and carried out in parallel as described in U.S. Provisional Application No. 60/436,339, filed Dec. 24, 2002, the entire contents of which are incorporated by reference herein. In the alternative, it may be desired to complete bar code processing before OCR processing commences, since it the case of pre-bar coded mail, the decision will most often be made based on the bar code.

If no destination address can be determined from either a postal bar code or a postal address read using the second image data, the mail piece is diverted for video coding. This preferably involves saving at least one of the first and second image data, marking the mail piece with an identification code, and then diverting the mail piece for holding until video coding is completed. The data saved is preferably the first data, e.g. grayscale or color, which will give the operator the best chance to see the address image.

The invention further provides computerized systems for implementing the foregoing methods, as described hereafter. These and other aspects of the invention are further described and discussed in the detailed description, which follows.

BRIEF DESCRIPTION OF THE DRAWING

In the accompanying drawing, wherein like numerals represent the same or similar elements throughout.

DETAILED DESCRIPTION

This invention provides a novel method to improve the determination of addresses and other information contained on mail items and documents where multiple recognition processes (OCR and bar code) are being performed in parallel or in sequence and are unable to completely resolve the data on the mail item or document. The invention does so by adding an image buffering system that holds the image until traditional image processing techniques run to completion. As the following example shows, the invention enables the performance of existing mail processing systems to be improved without requiring major changes to the existing processes. This is especially important where disruption causes loss of productivity and has economic impact.

Figure 1:
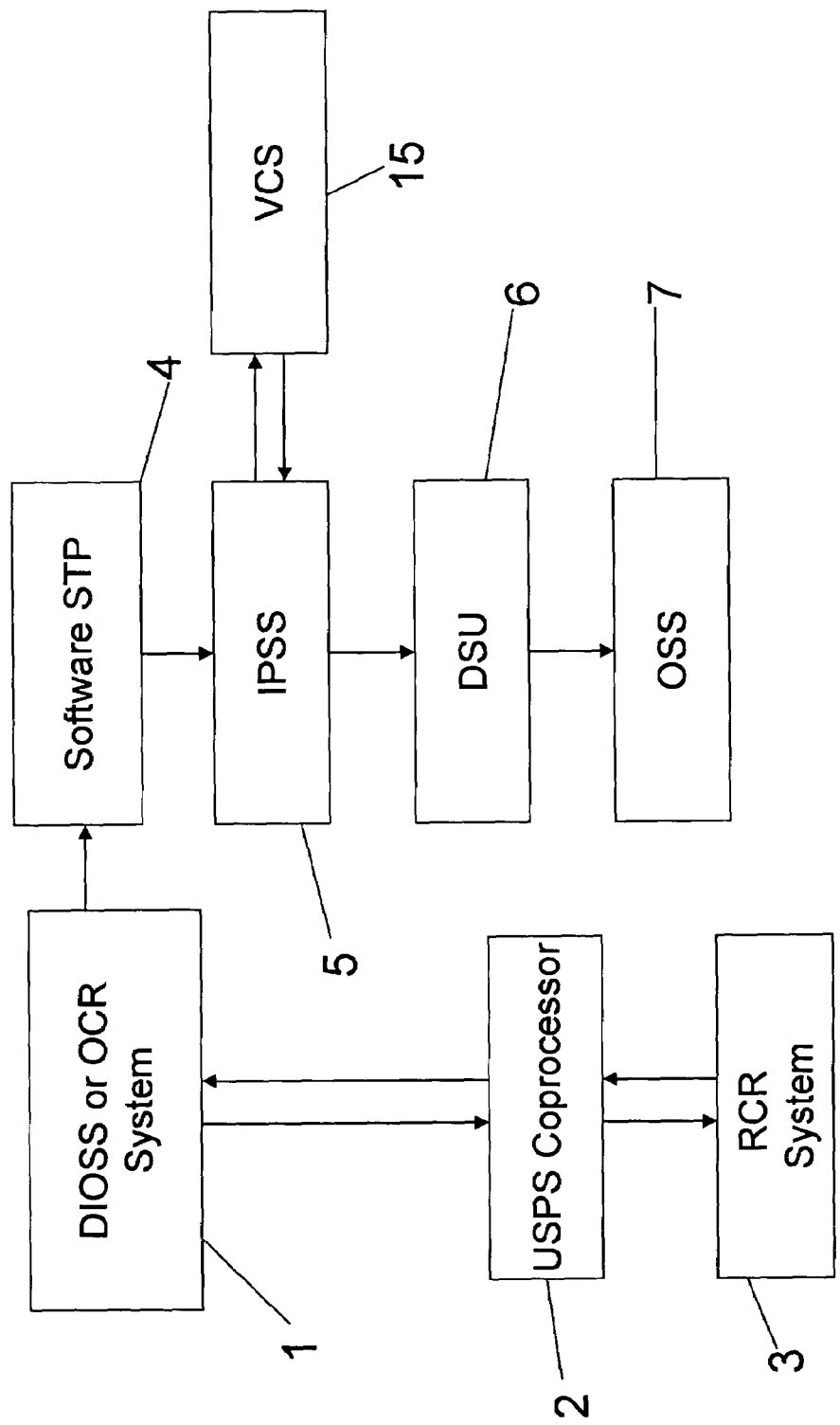
FIG. 1 is a schematic diagram of a prior art system for scanning mail pieces.

As shown in FIG. 1, the current state-of-the art deployed postal address processing system 1 (DIOSS, DBCS-OCR, or MLOCR) either decodes a pre-printed bar code or performs OCR image processing (limited to a binarized image), depending upon the mode in which the machine is operating. In the OCR mode of operation, a gray scale or color image may be captured by the imaging camera system of system 1. Often bandwidth limitations or the speed of hardware deployed a number of years ago require that the image be binarized prior to being processed by system 1, by itself or in parallel with additional computers 2 and 3 known in the art as USPS coprocessor 2 and remote computer reader (RCR) 3.

These binarized images are then processed. A certain fraction of the images cannot be resolved due to the quality of the binarized image. Whenever the binarized image is not resolved to the finest level required to process the mail item through the automated processes, the resultant reject image from the automated system 1 is sent to an image storage and transfer processor 4, then transferred to an image processing sub-system 5, and then sent to a video coding station at which a human operator reviews the binarized image and can often resolve it and determine a zip code. The rejected mail is then re-run on an output sub-system (OSS) 7 to apply the correct bar code for the determined zip code.

Another method of operation for this equipment is to operate in a bar code only mode. In this method of operation, the OCR functions and image lifter are turned off (or not present), and only a bar code reader is used to determine the address zip code and the resultant sorting of mail. Alternatively, the OCR and image lift function may be optimized to process only bar coded mail items. When the bar code recognition function does not successfully determine a bar code from the pre-printed bar code, the item is rejected and the physical item must then be re-run on an OCR capable mail processing system as discussed above.

This invention provides a cost effective method to process the full gray scale or color image by adding an image buffering computer or other device to the camera output which buffers sufficient images to permit the traditional automated recognition process to continue until the process or multiple processes (e.g., OCR or BCR) have run to completion. At the completion of the automated recognition process, but before the binarized image is transmitted to the human operator for keying, feedback is sent to the image buffering computer that a specific process has not resulted in a bar code or address recognition. The full gray scale or color image is then conveyed to an appropriate automated recognition process where more robust algorithms are invoked to resolve the image. This intermediate process provides enhanced image processing which resolves many more mail items that cannot be finalized by the traditional binarized process, and permits other data on the mail item to be processed for value added purposes. Data routinely placed on mail items such as the return address, postal and non-postal bar codes indicating special services, such as certified or registered mail, tracking codes and other corporate endorsements such as internal distribution codes, or indicia patterns can be detected by special software routines loaded into this single process. This provides a postal service or commercial mail processor with a simple method to process these codes and markings without changing all the other OCR processes that they may have.

Any images for which processing of the gray scale or color image cannot make the final determination are released for viewing by a human operator in any of the various binary, grayscale or color methods that are readily available. In this manner, selective use of grayscale or color images stored in a rolling buffer to increase the number of successful machine decodes reduces the cost of image processing as well as maximizes the opportunity for an automated solution thru the use of optical character recognition (OCR), bar code readers (BCR), specialized video processing systems, image processing systems, forms readers, forms video processing, video coding systems and/or any combination thereof.

Figure 2:
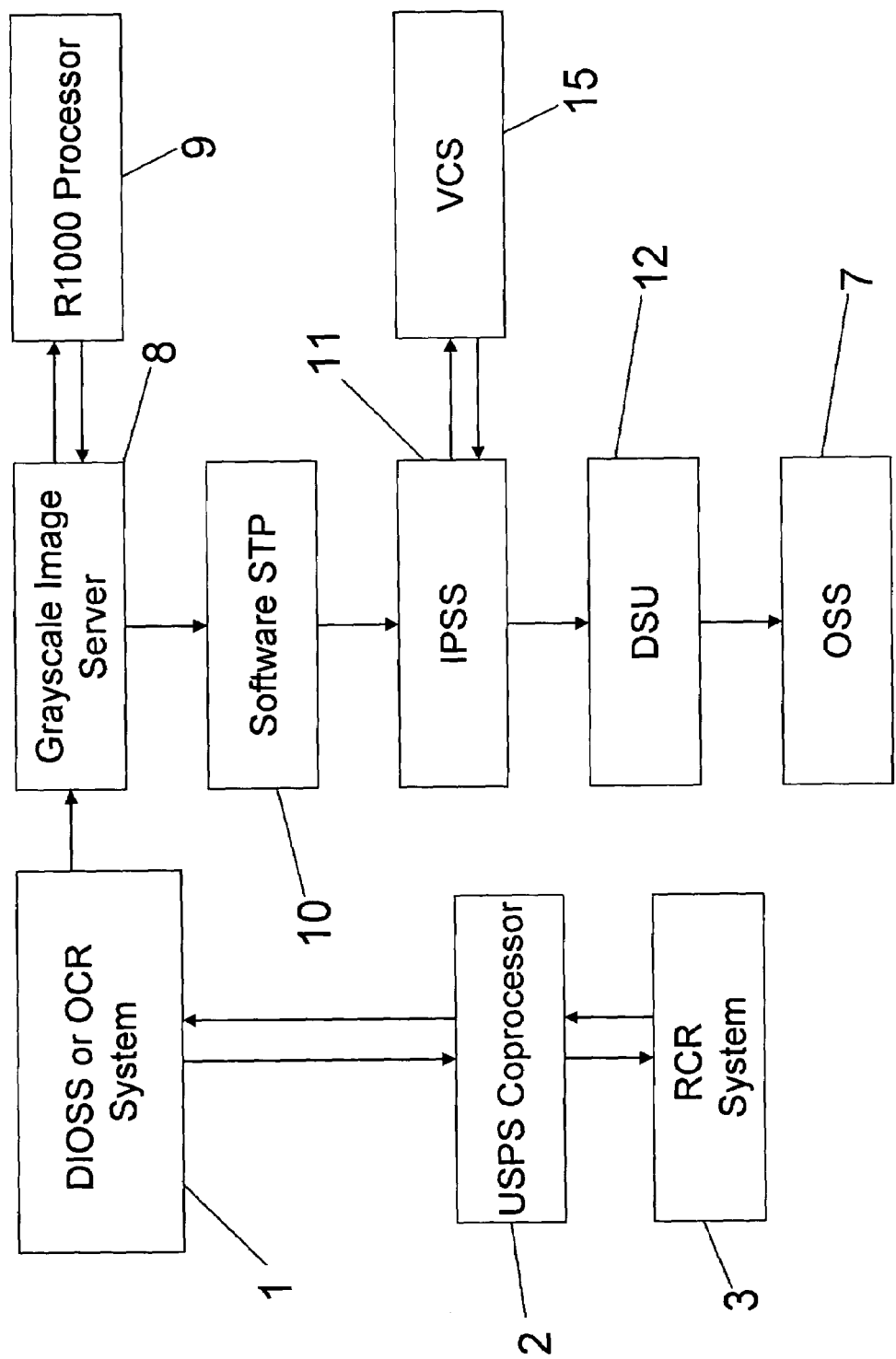
FIG. 2 is a schematic diagram of a system for scanning mail pieces according to the invention.

Turning to FIG. 2, an embodiment of a system of the invention includes a Delivery Bar Code Sorter Input Output Subsystem (DIOSS) 1 through which a stream of mail pieces is processed for sorting. DIOSS has both bar code and optical character readers and a printer for applying a POSTNET bar code identifier to mail pieces. The incoming mail to DIOSS 1 may be one of several types. Some mail pieces will have mailer-prepared delivery point bar codes on them. In such a case, the bar code is scanned by the bar code scanner of the system, and if successfully read, the mail piece is sorted according to the bar code. If the bar code is missing or unreadable, then an image of the address taken by the OCR scanner is used to determine the destination address, and if successful, the mail piece is sorted according to the result.

Prior to sorting, a POSTNET bar code is most often applied to the scanned mail piece. As is known in the art, when the machine is running in OCR mode, the OCR image is read, an address determined, a POSTNET code determined and then, before the mail gets to the bar code reader, a POSTNET code is sprayed onto the mail piece. The bar code reader reads the bar coded zip code, and then a sort decision is made. The mail piece can then be run on any other machine anywhere and be sorted properly. A second printer is provided to spray on the reverse side of a mail piece an identification tag code. The ID tag is printed when no address can be determined by an OCR machine. The image associated with this tag is sent off for video coding or further processing, then the ZIP code results are linked to the ID tag in a database. At a later time when this mail piece is run, the ID tag is read, and the results are looked up, sent to the machine in real time and the mail piece is then sorted. In some cases, no POSTNET code is printed from this lookup, but in others a POSTNET code is sprayed before it is sorted. In general, when a POSTNET code is sprayed by a postal processing machine it is almost always used for processing by other machines down the line in the distribution process that do not have the capability to print POSTNET codes.

In current DIOSS machines, the image acquired is in grayscale format and is immediately converted to a binary format for OCR and bar code recognition processing as illustrated in FIG. 1. If neither a bar code nor a recognizable address is found, the mail piece is assigned an ID code and diverted for video coding (human review of the mail piece image to determine, if possible, the correct delivery point address.) Transit time for a mail piece through a DIOSS sorting machine is in the range of approximately 3 to 5 seconds. If image data for a mail piece cannot be resolved during that period, the mail piece must be sorted as a reject or as a 5-digit (if only the first 5 digits of the zip code can be determined.)

According to the invention, a copy of each gray scale image is transmitted from DIOSS 1 to a gray scale image server 8 at the time of creation. Server 8 stores the image in a memory buffer containing a predetermined number of the most recently taken images in the order received. OCR image data is analyzed by OCR software of the DIOSS 1 itself and is also transmitted to a coprocessor 2 and a remote character reader (RCR) 3. DIOSS 1, coprocessor 2 and RCR 3 each analyze the image using different OCR logic. The results from DIOSS 1 and RCR 3 are each transmitted to coprocessor 2, which arbitrates the result by methods known in the art.

The arbitrated result is sent back to DIOSS 1. If the image was read successfully and a ZIP+4 delivery point identified, DIOSS 1 sends a signal to image server 8 instructing it to discard or archive the grayscale image saved for that mail piece. Information obtained from the image data, typically a header including destination information and a copy of the binary image data, is transmitted to a storage and transfer processor (STP) 4. In the majority of cases, image data for mail pieces will be resolved and a sorting decision made at DIOSS 1, and a POSTNET bar code label will be printed on the mail piece in DIOSS 1 in real time.

The ability to archive the grayscale image may become increasingly important for forensic reasons in the event of a bio-terrorist attack. According to a further aspect of the invention, all of the sorter machines used by the USPS forward their archived image data (binary, grayscale/color, or both) to a central database which stores the image for a period of time, along with identifying information (destination address or ID number), the date and time of processing, and the identity and location of the sorting machine that handled the mail piece. This data, extremely large in volume, would be saved for a period of time before being discarded, anywhere from several days, a month, or a year or more depending on storage capacity available. Law enforcement officials working on a case wherein contaminated letters were sent through the mail could thereby determine accurately where the mail piece was processed so that decontamination can be carried out and any patterns of mailing used by the perpetrator can be analyzed.

If the binary image cannot be resolved, DIOSS 1 signals image server 8 to transmit the gray scale image data to gray scale processor 9. Gray scale processor 9, such as a Siemens R1000 system, is tuned for decoding the gray scale image data. If gray scale processor 9 is provided with multiple processors for applying different algorithms to the image data, an additional processor or processors may be provided to arbitrate the results obtained using the different algorithms. The results of the image processing by image processor 9 are transmitted back to image server 8. If the gray scale image was likewise unreadable or readable only to 5 digits, then the initial result remains unchanged.

Image server 8 can also send a copy of the image or a differently processed binary image to the remote computer reading (RCR) system 3. Results returned from RCR 3 can be compared with those from gray scale processor 9 to obtain the highest quality result.

Time permitting, a sorting decision can then be made using the result of the secondary decoding process, reducing the overall number of mail pieces that are rejected. In such a case, server 8 transmits the result back to DIOSS 1 and action is taken to mark the mail piece with the correct bar code and sort it accordingly. If a successful result is obtained after the point of no return for the mail pieces in the conveyor pathway, it can be sorted to a separate batch of rejects not requiring manual review (video coding). When an ID number is applied as described above, the mail pieces in this batch must be re-fed through the sorter, but the time associated with video coding is saved. For this purpose, if processor 9 succeeds in reading the gray scale image but corrective action must be taken after the initial sort is completed, such result is transmitted to STP 10 from image server 8, and header information for that binary image is revised to include the result of the gray scale process.

According a preferred form of the invention, STP 10 comprises an image and data storage buffer and forwarding device that maintains a queue of images and results received from DIOSS 1 and gray scale image server 8. In the known system shown in FIG. 1, by contrast, the original gray scale image data is discarded and STP 4 receives only the black and white data from DIOSS 1. Header and unresolved image data are transmitted from STP 10 to an image processing sub-system (IPSS) 11 that provides image and result management functions. IPSS 11 routes image data that cannot be resolved without operator intervention to a video display terminal (VDT) of video coding system 15 where the image is reconstructed on a video screen, allowing an operator to visually decipher the image and key in the address information from the image. In the known system of FIG. 1, this image is the black and white (binary) one; according to the invention, it becomes possible to provide the VDT operator with the grayscale or color image from image server 8.

STP 10 according to the invention is modified as compared to the STP 4 currently in use in that it delays sending results to IPSS 5 until finalized results are received from image server 8 and processor 9. The STP image header is revised to reflect the correct destination point code when server 8 informs STP 10 that an image previously identified as a reject or 5-digit has been fully decoded. Similarly, IPSS software 11 is revised to accommodate the revised image header. As a result, substantially fewer images are sent to video coding as compared to the prior process.

Results from the above-described image processing functions are transmitted from IPSS 11 to DSU 12 for storage. These comprise include results returned to IPSS 11 from video coding, or gray scale processing for items that have missed the first processing run and must be re-run in a second pass. These second pass mail piece results are fed from DSU 12 into output subsystem 7, which operates in a conventional manner, except that some of the corrected results it receives are from the gray scale processor, not video coding. Output subsystem 7 reads the ID code previously applied (as by printing) to a mail piece that could not be identified, checks DSU 12 for a corrected result, and then applies the corresponding POSTNET bar code to corrected items.

Figure 3:
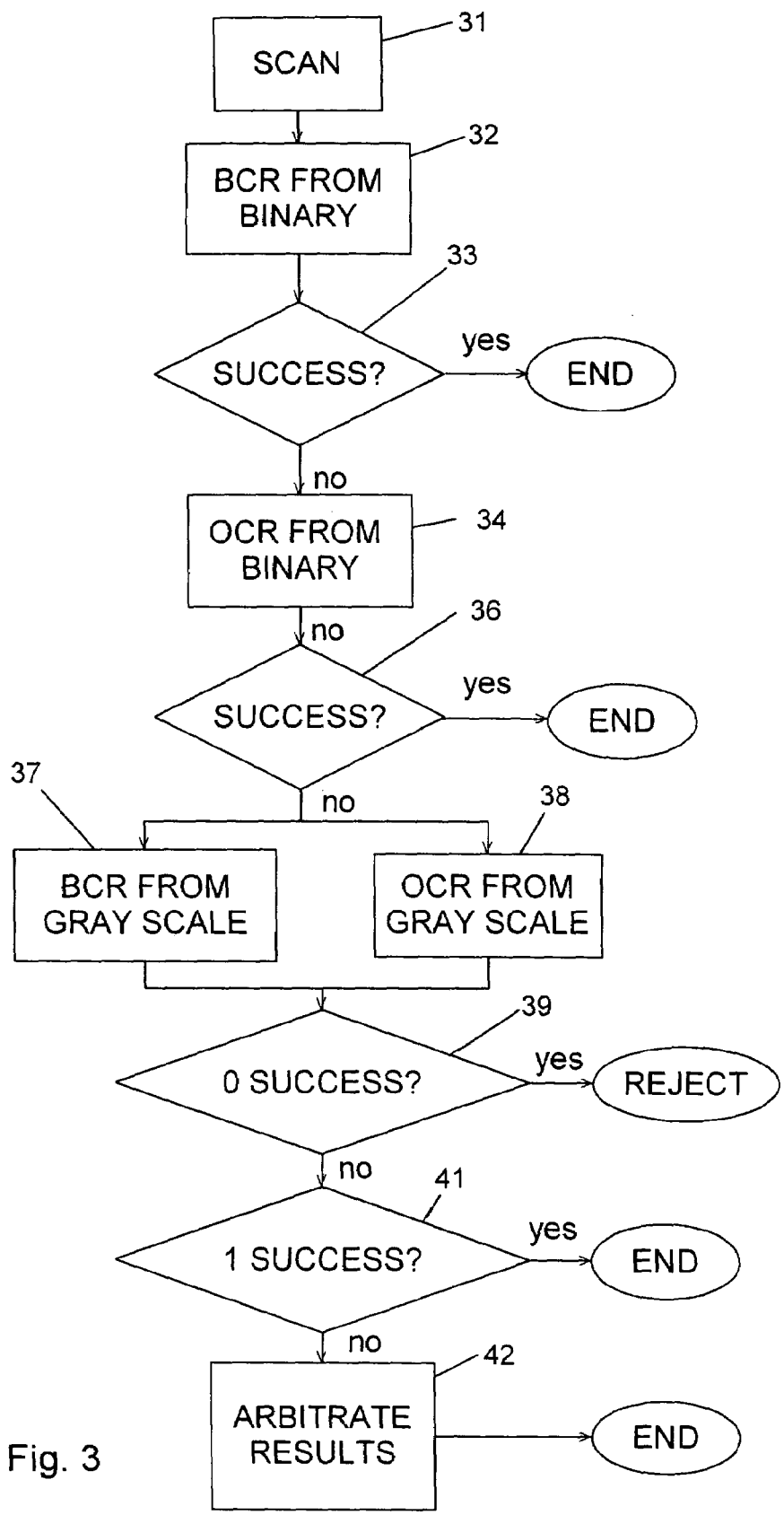
FIG. 3 is a flow chart of logic according to one embodiment of the invention.

An example of control logic for a system having both OCR and BCR capabilities is shown in FIG. 3. After an initial scan 31, a first attempt 32 is made to read a bar code using the binary data. If this read is successful (decision 33), as it is in most cases, the process then terminates and the grayscale data in the buffer is discarded or archived. If it fails, then an attempt 34 is made to read the binary address information by an OCR process. If this second read is successful (decision 36), the process then terminates, and the grayscale data in the buffer is discarded or archived. If both attempts to read the binary data have failed, then the grayscale data held in the buffer is processed, in this case in parallel steps 37, 38, in an attempt to determine a grayscale BCR result and a grayscale OCR result. Of these two attempts, if neither is successful (decision 39) then the mail piece is rejected and may then be labeled with an ID number and sorted to a reject bin for video coding. If one attempt succeeds but the other fails (decision 41), then the process terminates, resulting in sorting of the mail piece according to the successful result if time permits, or labeling with an ID tag and subsequent relabeling with a postal bar code as described above. If both attempts were successful, then arbitration logic is applied (step 42) and the mail piece is sorted according to the result or, more likely, labeled with an ID tag and reprocessed for relabeling with a postal bar code.

It will be evident to one of skill in the art that these steps could be rearranged or varied in accordance with desired performance parameters. For example, the binary read steps 32–36 can be executed in parallel rather than in series as shown, and a separate scan can be initiated for each if the sorting system has separate bar code and OCR scanners. The end result of such first stage processing can be arbitrated in the same manner as in step 42. However, for most efficient processing, a successful bar code read in steps 32–33 will normally end the process. Each of the various decoding steps may be executed by several different software systems and the result arbitrated in each case before comparison to the other results from other steps.

The invention thereby provides a means of increasing the machine-based resolution rate of image data scanned from flat objects such as mail pieces without substantially increasing processing time. This result is achieved though the use of a data intensive image format and processing such as gray scale or color image processing that is utilized only when the resolution of the less data intensive black and white image data fails. In this manner, operator intervention in image processing is minimized, throughput and efficiency is increased and processing costs reduced.

Although various embodiments of the invention have been illustrated in the accompanying drawings and described in the foregoing detailed description, it will be understood that the invention is not limited to the embodiments disclosed but, as will be appreciated by those skilled in the art, is susceptible to numerous modifications and variations without departing from the spirit and scope of the invention as hereinafter claimed. For example, while various functions have been described as performed on different computers or processors, it is specifically contemplated that a greater or lesser number of computers or processors may be used to perform the various functions described herein, depending upon the specific, design, application and system configuration. The described system process is not limited to mail pieces, and is applicable to any information bearing item wherein the information is to be scanned and an action taken based on the result, such as sorting or printing with a coded label.

The invention claimed is:

1. A method of processing an image containing written information, comprising the steps of:
  (a) scanning a surface of an object to obtain an image of the surface represented by first image data;
  (b) creating second image data of the image of the surface from the first image data, the second image data having a lower data density than the first image data, wherein the second image data is derived from the first image data by a computer-implemented image conversion process;
  (c) analyzing the second image data with computer-implemented first image analysis logic to decode the written information; and
  (d) if the written information cannot be decoded to a desired extent from the second image data, analyzing the first image data with computer-implemented second image analysis logic different from the first image analysis logic to decode the written information.

2. The method of claim 1, further comprising:
  transporting a series of the objects on a conveyor system leading past a scanner which carries out step (a);
  repeating steps (a)–(d) for a succession of images generated by each object as it passes the scanner;
    maintaining a buffer containing the first image data for a number of consecutive images so that the first image data is maintained in the buffer during step (c); and
    accessing the buffer to obtain the image for processing in step (d).

3. The method of claim 2, further comprising sorting the object according to the decoded written information.

4. The method of claim 2, further comprising, following successful analysis of the written information in step (c) for an image, erasing the first image data for that image from the buffer.

5. The method of claim 4, further comprising transferring the first image data to an archival storage medium prior to erasing the image from the buffer.

6. The method of claim 1, wherein the first image data is in a grayscale or color format and the second image data is in a binary format.

7. The method of claim 3, wherein the objects are mail pieces.

8. The method of claim 7, wherein the images are images of a mail piece surface, step (a) further comprises feeding a series of mail pieces through a scanning device to obtain the succession of images, and the first and second image data are analyzed to obtain destination information.

9. The method of claim 1, wherein the objects are change of address forms, and the written indicia include a name, a new address and a former address.

10. A method of sorting mail pieces on an automated sorting machine, comprising the steps of:
(a) transporting a series of mail pieces on a conveyor system past a scanner, which conveyor then transports the mail pieces to a sorting section of the sorting machine;
(b) scanning a surface of each mail piece with the scanner to obtain an image of the surface represented by first image data in color or grayscale format;
(c) creating second image data in binary format from the first image data;
(d) analyzing the second image data with computer-implemented first image analysis logic to decode the written information to obtain destination information sufficient for sorting;
(e) if the written information cannot be decoded to a desired extent from the second image data, analyzing the first image data with computer-implemented second image analysis logic different from the first image analysis logic to decode the written information to obtain destination information sufficient for sorting; and
(f) then sorting each mail piece at the sorting section according to the decoded destination information.

11. The method of claim 10, further comprising:
maintaining a buffer containing the first image data for a number of consecutive images so that the first image data is maintained in the buffer during step (d); and
accessing the buffer to obtain the first image data for processing in step (e).

12. The method of claim 10, further comprising:
determining if a mail piece has a postal bar code thereon;
if the mail piece has a postal bar code thereon, analyzing the second image data to decode the postal bar code;
if the decoded postal bar code identifies a destination, ending the method as to such mail piece; and
if the mail piece has a postal bar code thereon that cannot be decoded, analyzing the second image data to decode the postal bar code.

13. The method of claim 12, wherein the bar code is a ZIP plus 4 delivery point bar code.

14. The method of claim 12, wherein if a destination cannot be determined in step (e) until after the mail piece has entered the sorting section, then
printing the mail piece with an identification code;
saving the result determined in step (e) to a decision storage unit; and
feeding the mail piece into an output subsystem, which obtains the result from the decision storage unit, reads the identification code, and marks the mail piece with a postal bar code indicating the destination.

15. The method of claim 10, further comprising:
determining if a mail piece has a written address thereon;
if the mail piece has a written address thereon, analyzing the second image data to decode the written address;
if the decoded written address identifies a destination, ending the method as to such mail piece; and
if the mail piece has a written address thereon that cannot be decoded, analyzing the second image data to decode the written address, wherein the first and second image analysis logic each comprise optical character recognition logic.

16. The method of claim 15, further comprising marking a mail piece successfully analyzed in steps (d) or (e) with a postal bar code indicating the destination prior to sorting the mail piece in step (f).

17. The method of claim 15, wherein if a destination cannot be determined in step (e) until after the mail piece has entered the sorting section, then:
printing the mail piece with an identification code;
saving the result determined in step (e) to a decision storage unit; and
feeding the mail piece into an output subsystem, which obtains the result from the decision storage unit, reads the identification code, and marks the mail piece with a postal bar code indicating the destination.

18. A method of processing an image containing written information, comprising the steps of:
(a) scanning a surface of an object to obtain an image of the surface represented by first image data, the first image data selected from one of grayscale data and color data;
(b) creating second image data of the image of the surface in a binary format derived from the first image data by a computer-implemented image conversion process;
(c) analyzing the second image data with first image analysis logic to decode the written information; and
(d) if the written information cannot be decoded to a desired extent from the second image data, analyzing the first image data with second image analysis logic different from the first image analysis logic to decode the written information.

19. The method of claim 18, wherein the first image data is color data.

20. The method of claim 18, wherein the first image data is grayscale data.

* * * * *